Figures 1, 2, 3:
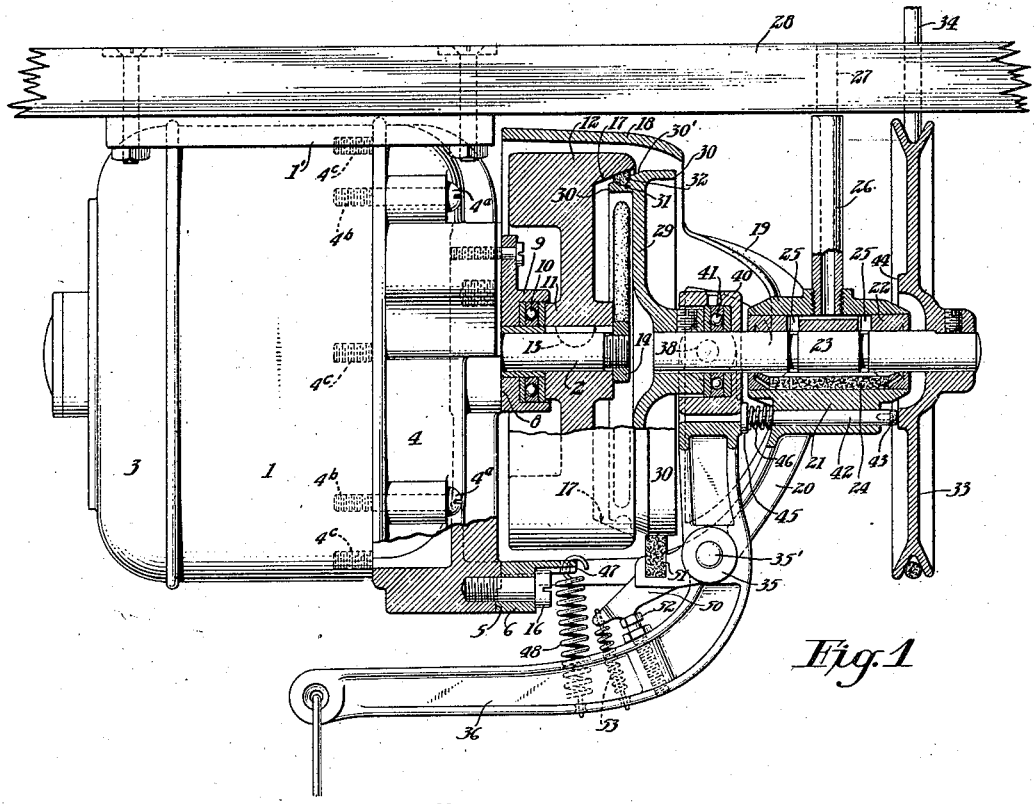

Oct. 7, 1924.                                                                      1,510,728
I. F. WEBB
UNITARY MOTOR AND POWER TRANSMITTER MECHANISM
Filed May 29, 1922          4 Sheets-Sheet 1

WITNESSES:
Adrian DeMarr
John H. Hring

INVENTOR
Irving F. Webb
BY
Henry Miller
ATTORNEY

Oct. 7, 1924.  
I. F. WEBB  
1,510,728

UNITARY MOTOR AND POWER TRANSMITTER MECHANISM

Filed May 29, 1922  4 Sheets-Sheet 2

WITNESSES:

INVENTOR
BY
ATTORNEY

Oct. 7, 1924.

I. F. WEBB 1,510,728

UNITARY MOTOR AND POWER TRANSMITTER MECHANISM

Filed May 29, 1922 4 Sheets-Sheet 3

WITNESSES:

INVENTOR
Irving F. Webb
BY Henry J. Miller
ATTORNEY

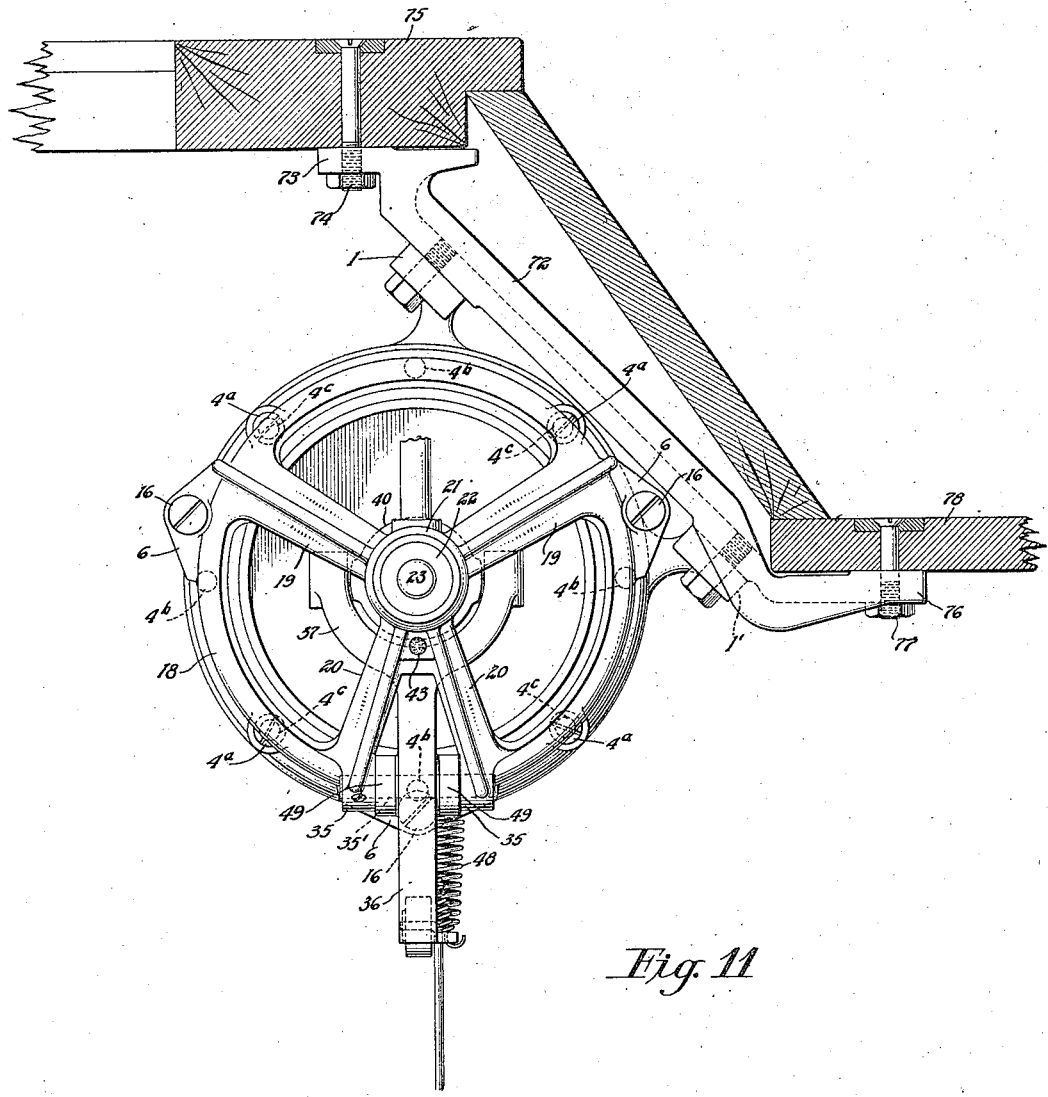

Patented Oct. 7, 1924.

1,510,728

UNITED STATES PATENT OFFICE.

IRVING F. WEBB, OF ELIZABETH, NEW JERSEY, ASSIGNOR TO THE SINGER MANUFACTURING COMPANY, OF ELIZABETH, NEW JERSEY, A CORPORATION OF NEW JERSEY.

UNITARY MOTOR AND POWER-TRANSMITTER MECHANISM.

Application filed May 29, 1922. Serial No. 564,287.

*To all whom it may concern:*

Be it known that I, IRVING F. WEBB, a citizen of the United States, residing at Elizabeth, in the county of Union and State of New Jersey, have invented certain new and useful Improvements in Unitary Motor and Power-Transmitter Mechanisms, of which the following is a specification, reference being had therein to the accompanying drawings.

This invention relates to a unitary motor and power-transmitter mechanism adapted more particularly for use in manufacturing establishments as an individual sewing machine driver; each machine having its own individual motor and transmitter unit.

A sewing machine driver of this type commonly embodies a driving motor to the shaft of which is connected the driving element of a friction clutch; the driven element of such clutch being connected to a manual control mechanism and embodying a belt pulley which is connected to the machine to be driven. Such a driver is customarily mounted on the underside of a sewing machine table and a belt is passed upwardly through apertures in the table from the belt-pulley of the driven clutch-element to the sewing machine pulley. Drivers of this type, as heretofore constructed, possess certain disadvantages among which may be mentioned the excessive friction losses due to the extension of the driving or motor shaft into or through the driven clutch-element; the latter being journaled on the driving shaft. When the sewing machine is at rest there is a continuous friction loss due to the turning of the driving shaft in the then stationary pulley or driven clutch-member which is forced laterally of the driving shaft by the tension of the belt. Then again, with prior constructions, the belt can only be extended vertically, or nearly so, in a plane at right angles to the driving shaft; a material departure from the vertical causing the belt to rub on the auxiliary frame of the driver which frame assists in the support of the clutch-elements and the treadle-controlled clutch-operating means. Still further, with prior sewing machine drivers, it is difficult to remove and replace the belt upon the pulley of the driven clutch-element, since the auxiliary frame obstructs belt removing and replacing operations. Also, it has heretofore been necessary in many cases to disconnect the belt-ends prior to tilting the sewing machine rearwardly for inspection or adjustment of the parts beneath the cloth-plate.

The present invention has for an object to provide a unitary motor and power-transmitter in which the above noted and other disadvantages of prior constructions have been overcome, and in which the frictional losses have been reduced to a minimum.

Another object of the invention is to provide against the tendency of the clutch elements in a manually controlled motor driving unit having a quick pick-up, to stick together in driving relation when the operator manipulates the treadle or other controlling element to declutch the driver.

Another object of the invention is to provide the driving unit with an effective and quick acting brake, and with means to compensate for wear on the clutch and brake elements, in order that excessive movement of the treadle will not be required to operate the device.

Another object of the invention is to provide a driving unit which can be mounted on either a flat-top or trough-top type of sewing machine table, in position for convenient and efficient operation.

Still further, the invention has for an object to overcome the chattering of the rotating parts; an annoyance encountered in certain prior installations of individual motor drivers when the driven machine is being accelerated.

Further objects of the invention will appear from the following description and claims.

To the attainment of the ends in view, the motor-shaft has fixedly mounted thereon a weighted driving wheel having a friction surface, preferably conical in form; the driving shaft being preferably not extended beyond the driving wheel. An auxiliary frame is rigidly associated with the motor-frame, either by being secured directly thereto or to a rigid base to which the motor is secured. The auxiliary frame is provided, in alinement with but beyond the end of the driving shaft, with a bearing for the transmitter-shaft the ends of which preferably project in opposite directions beyond the ends of the bearing. The driven clutch-element is mounted on the inner end of the transmitter-shaft adjacent the driving wheel and is preferably formed with a conical face complementary to that of the driving wheel. One of the conical clutch-faces is preferably fitted with a facing of friction material, such as leather, and it has been discovered that if this facing is made non-continuous circularly, but is interrupted at intervals by relatively large gaps, about equal to the lengths of the active sections of the friction facing, all tendency to chattering of the parts is effectively eliminated and quiet acceleration secured. Preferably, the sections of the facing are three in number, to give in effect a three-point driving contact, this arrangement having been found to be particularly effective.

The belt-pulley is preferably separated from the driven clutch-element and is mounted on the outer end of the transmitter-shaft clear of the auxiliary frame and in a position such that the driving belt may be removed and replaced with maximum facility. With this arrangement it is unnecessary to disconnect the ends of the belt prior to tilting the sewing machine rearwardly, since the lower loop of the belt may readily pass upwardly across the free end of the transmitter shaft.

Since there is no connection or contact between the driving and driven shafts, except through the clutch-element, it will be evident that when the driven shaft is stationary there are no friction losses between the latter and its bearing or bearings; the driving shaft running freely in its bearings with no lateral pressure imposed thereupon by the belt-tension.

The driven shaft is preferably mounted for endwise sliding movement toward and from the driving wheel, which movement is under control of a treadle or similar manually operated mechanism. This mechanism preferably embodies separate and relatively adjustable clutch and brake levers which are preferably mounted on the auxiliary frame. The clutch-lever preferably operates to move the transmitter or driven shaft and elements carried thereby away from, as well as toward, the driving wheel, thus overcoming a possible tendency of the clutch elements to stick together.

It is preferred to provide means for securing the auxiliary frame to the motor-frame in different positions angularly of the motor-shaft, so that the auxiliary frame may be supported in correct operative position relative to the table-top and manual control mechanism, regardless of whether the supporting feet or base of the motor are or is secured in a horizontal, vertical or inclined plane. This provision renders the appliance adaptable for use on trough-top as well as flat-top tables.

Figure 4:
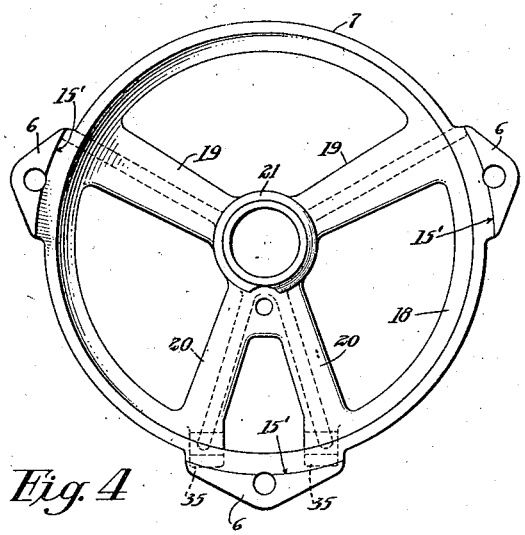
Figure 5:
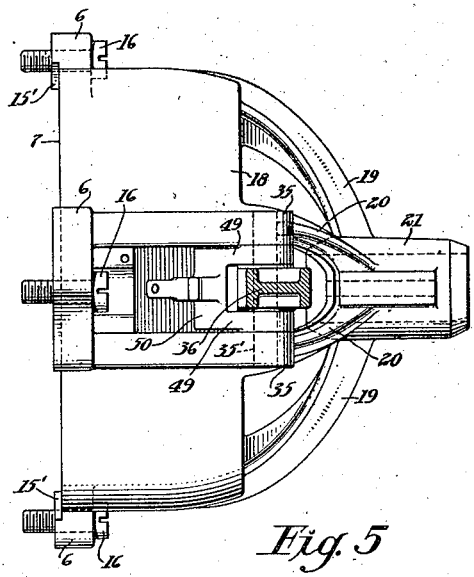
Figure 6:
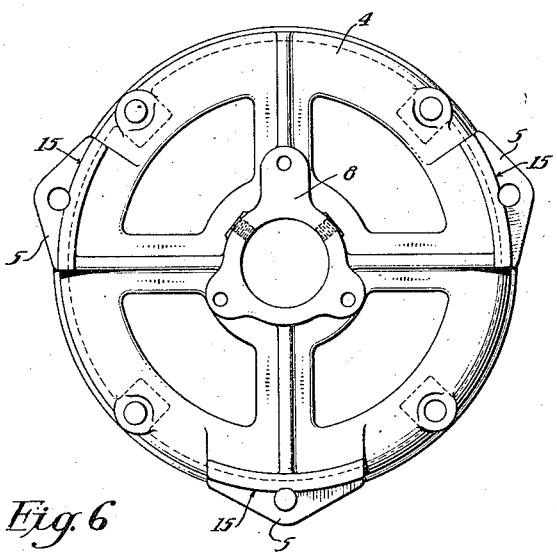
Figure 7:
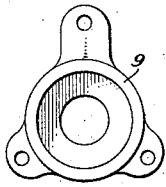
Figure 8:
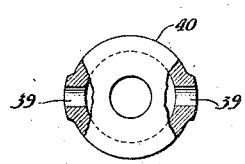
Figure 9:
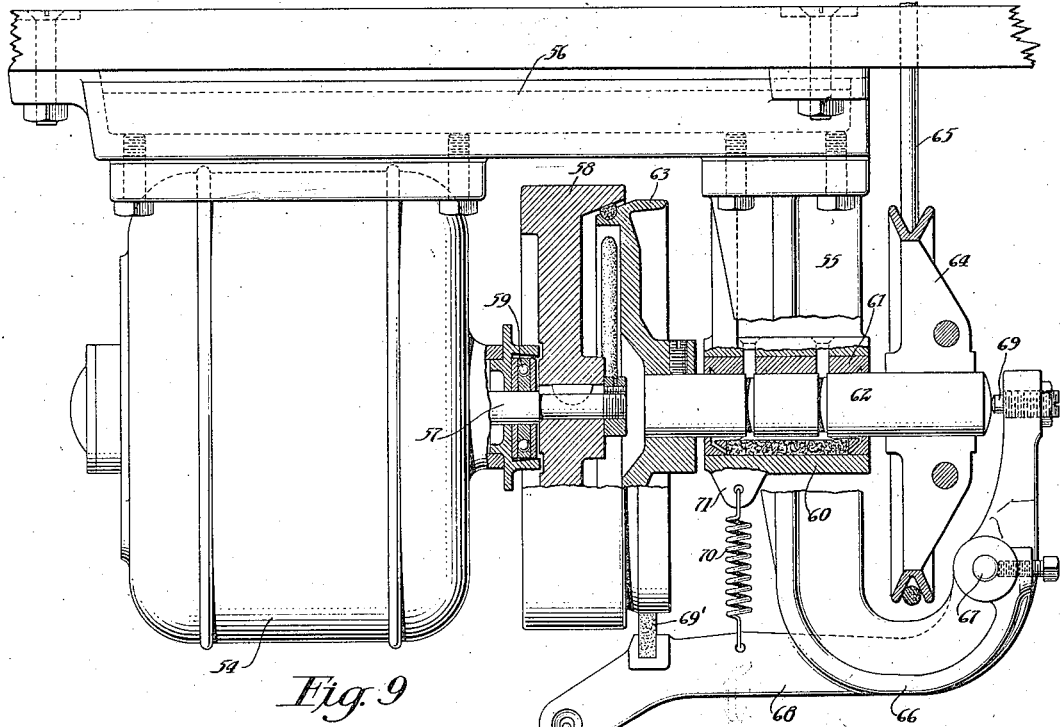
Figure 10:
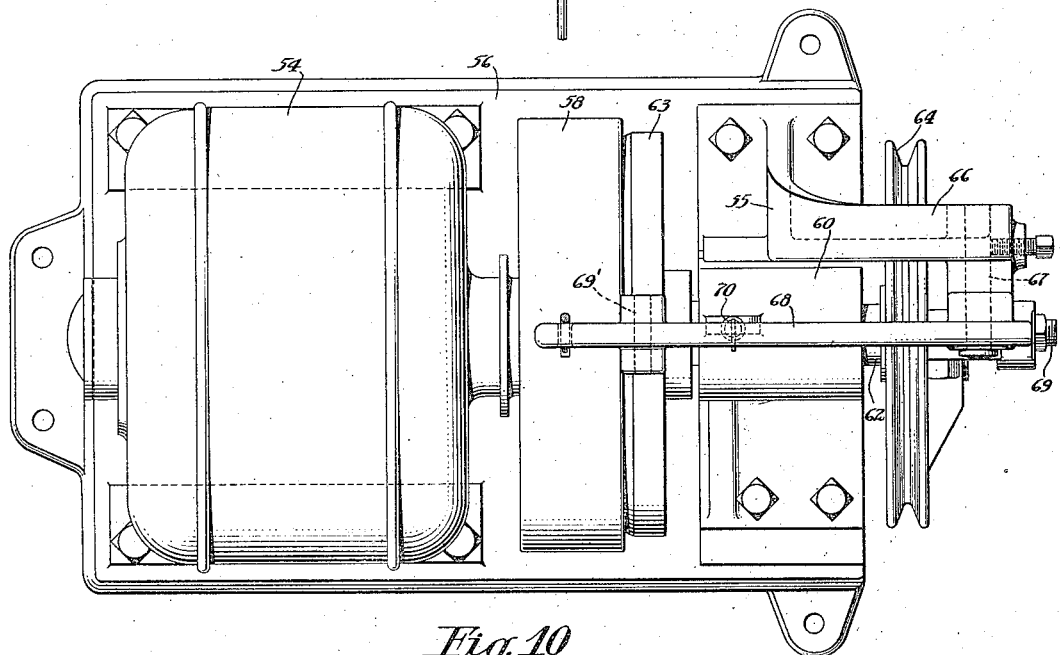

In the accompanying drawings, Fig. 1 is a side elevation, partly in section, of a unitary motor and power-transmitter embodying the invention and applied to a flat-top sewing machine table. Fig. 2 is a right end elevation of the same. Fig. 3 is an inner face view of the driven clutch-element. Fig. 4 is a left hand elevation of the auxiliary or transmitter frame. Fig. 5 is a bottom plan view of the latter. Fig. 6 is a right end elevation of the end element of the motor-frame which carries the transmitter frame; the latter having been detached from such end element. Fig. 7 is a face view of the cup-element of a motor ball-thrust bearing which is preferably provided. Fig. 8 is a detail view, partly in section, of the cup-element of a transmitter ball-thrust bearing. Fig. 9 is a side elevation, partly in section, of a modified form of the invention. Fig. 10 is a bottom plan view of the driving unit shown in Fig. 9 and Fig. 11 is a view similar to Fig. 2 but showing the driver applied to a trough-top sewing machine table.

In the preferred embodiment of the invention, as illustrated in Figs. 1 to 8 inclusive, 1 represents the field-frame of an electric-motor having the usual supporting feet 1'. The power-shaft 2 of the motor is journaled as usual in the end-frame elements or castings 3, 4 the latter of which has in the present instance been somewhat modified by having formed thereon three circularly spaced seats 5 for the complementary feet 6 of the auxiliary or transmitter frame 7.

The motor end-frame element 4 is secured to the field frame 1 by means of the usual screws 4ª which enter the set of threaded apertures 4ᵇ spaced apart say 90° around the motor-shaft. The frame-element 4 is also formed with a centrally disposed seat 8 for the apertured cup-member 9 of a ball thrust-bearing 10 interposed between the motor-frame and the hub 11 of the weighted fly-wheel 12 which is fixedly mounted upon the motor-shaft 2 by means of the semi-circular key 13 and nut 14. The seats 5 and feet 6 are formed with mating offset portions connected by circular wall-sections 15, 15' of equal curvature, whereby the transmitter frame may be accurately centered upon the motor frame; the screws 16 serving to hold the two frames rigidly together. The fly-wheel 12 has a heavy rim and constitutes the driving or live element of a friction clutch; its outer face being preferably cupped to provide an internal conical friction surface 17.

The transmitter-frame 7 is in the form of a casting comprising a substantially cylindrical guard flange 18 which covers the flywheel 12, and arms 19 and 20 which carry the housing 21 for the elongated bearing bushing 22 within which is rotatably and slidably journaled the transmitter-shaft 23. The bushing 21 is preferably provided with a lower insert 24 of an oil absorbent material, such as felt, and is formed in its upper side with suitable oil-ducts 25 communicating with the oil-tube 26 which leads upwardly to a point directly beneath the oil-hole 27 in the table-top 28 to which the driving unit is secured.

Fixed to the inner end of the transmitter-shaft 23 is a relatively light driven clutch-element 29 having a flange 30 formed with an external conical face 30' complementary to the face 17 of the driving element 12. The face 30' of the driven element is grooved at 31 to receive the strip 32 of friction material, such as leather. Preferably, the strip 32 is laced in and out through circumferentially spaced openings in the flange 30, as shown in Fig. 3; the openings preferably being six in number whereby the strip 32 is divided into three effective sections 32' separated by gaps substantially equal in length to the effective sections, which latter afford, in the embodiment illustrated, a three-point driving contact between the driving and driven members; each driving section 32' being diametrically opposed to a gap between adjacent sections. The outer end of the transmitter shaft has fixed thereto the belt-pulley 33 which in practice is connected to the sewing machine (not shown) by the belt 34 passing upwardly through the usual apertures in the table-top 28.

The arms 20 are formed with apertured bosses 35 in which is fixed a pin 35' serving as a fulcrum support for the clutch-operating bellcrank-lever 36, the horizontal arm of which is to be connected as usual with a treadle. The vertical arm of the lever 36 is in the form of a yoke providing spaced arms 37 in the apertured free ends of which are fixed the inwardly directed pins 38 which freely enter the over-size apertures 39 in a ring in the form of a cup-member 40 of the ball thrust-bearing 41 adjacent the hub of the driven clutch-member 29. The pins 38 are preferably of tubular form and are threaded internally and fitted with plug screws 38'. The pins 38 may thus be filled with a heavy lubricant, such as cup-grease, which can be forced into the bearing space, when desired, by screwing in the plug-screws 38'.

Journaled in the bearing housing 21 is a slide-pin 42 one end of which is preferably provided with a buffer-tip 43 of leather, fibre, or the like. When forced outwardly, this pin bears upon the circular face 44 of the pulley 33 and shifts the shaft 23 and driven wheel 29 away from the driving wheel 12. The inner end of the pin 42 is provided with a head 45 between which and the housing 21 is interposed a spring 46 which maintains the head 45 in contact relation with the vertical arm of the bellcrank-lever 36. The horizontal arm of the lever 36 is yieldingly connected to a lug 47 on the transmitter-frame by means of a spring 48 which latter supplies the force necessary to disengage the clutch-members when the downward pull upon the lever 36 is relieved.

Fulcrumed on the pin 35' between the bosses 35 and straddling the lever 36 are the legs 49, Figs. 2 and 5, of a bifurcated brake-lever 50 having a brake-shoe insert 51, Fig. 1, adapted to bear upon the flange 30 of the driven-wheel 29. The brake-lever derives its power from the spring 48 through the lever 36 which carries an adjustable abutment screw 52 in contact with which the brake-lever 50 is held by the spring 53. Wear on the brake-shoe 51 and sections 32' of the facing 32 may be taken up or compensated for by adjusting the screw 52 in the lever 36.

In the modified form of the invention illustrated in Figs. 9 and 10, the motor 54 and transmitter frame 55 are rigidly associated with a base 56 adapted to be secured to the under side of the table-top. The motor-shaft 57 has mounted thereon a fly-wheel 58 similar to the fly-wheel 12; a ball thrust-bearing 59 being provided between the fly-wheel and the frame of the motor. The transmitter-frame is formed with a bearing housing 60 for the bearing bushing 61 in which is journaled the transmitter-shaft 62 carrying at its inner end a driven clutch-element 63 preferably of the same construction as the clutch-element 27. At its outer end the shaft 62 carries a split belt-pulley 64 for the belt 65. The transmitter frame is formed with a downwardly extending hook-shaped arm 66 to the end of which is secured the fulcrum-pin 67 for the clutch-operating bellcrank-lever 68 in the vertical arm of which is an adjustable abutment screw 69 adapted to press endwise upon the outer end of the shaft 62 to establish driving relation between the clutch-members 58 and 63. The horizontal arm of the lever 68 is provided with a brake-shoe insert 69' and is connected by a spring 70 to a lug 71 on the transmitter-frame.

In applying the form of the invention illustrated in Figs. 1 to 8, inclusive, to a trough-top table, it is merely necessary to shift the screws 4ª to an additional set of apertures, such as shown at 4ᶜ, which are arranged in alternation with the apertures 4ᵇ and permit the effecting of a relative angular or rotary shift of the transmitter frame and the motor field frame 1, the former carrying the treadle controlled lever 36 and the latter having the base or feet 1'. By virtue of this provision the lever 36 may be sustained in a vertical plane while the feet 1' are disposed in an inclined plane and may be secured to the inclined bracket 72, the upper foot 73 of which may be bolted at 74 to the under side of the table-top board 75 while the lower foot 76 is bolted at 77 to the bottom board 78 of the table-trough. The driving unit may thus be supported far enough back from the front edge of a trough-top table to avoid encroachment upon the operator's leg room.

It will be observed that in both forms of the invention the clutch-operating lever has its longitudinal central plane of symmetry disposed substantially in coincidence with the vertical plane through the axis of the motor and transmitter shafts. This provision avoids any tendency of the operative forces to twist the levers 36 or 68. The momentum of the fly-wheel 12 will effect a quick pick-up of the driven machine when the driven clutch-member is forced into driving relation therewith, and the slide-pin 42 and brake 51 will operate to forcibly disengage the clutch-members and quickly stop the machine when the treadle pressure is relieved. The belt 34 may be readily removed from and replaced upon the pulley 33 and the ends of the belt need not be disconnected prior to tilting the driven machine for inspection of the parts beneath the bed-plate, since the lower loop of the belt may be drawn upwardly across the outer end of the shaft 23. Further, it will be evident that the belt 34 may extend in the plane of the pulley 33 at any inclination from the vertical without interference by the arms 19 and 20 of the auxiliary or transmitter frame. The device is economical of power since when the driven machine is idle the losses are confined strictly to the running light losses of the motor. The ball thrust-bearings of course assist materially in reducing frictional losses during acceleration of the driven machine.

Having thus set forth the nature of the invention, what I claim herein is:—

1. A driving mechanism comprising, in combination, a motor having a frame and a power-shaft, a transmitter-frame rigidly assembled with the motor-frame and having a bearing in line with said shaft, a driven-shaft journaled in said bearing and having both its ends extended beyond the latter, a driven clutch-member on the driven-shaft at the side of said bearing adjacent the motor, a belt-pulley on the shaft at the opposite side of said bearing, a driving clutch-member connected to the motor-shaft and disposed adjacent the driven clutch-member, and means for establishing driving relation between said clutch-members.

2. A driving mechanism comprising, in combination, a motor having a frame and a power-shaft, a transmitter-frame rigidly assembled with the motor-frame and having a bearing in line with said shaft, a driven-shaft journaled in said bearing and having both its ends extended beyond the latter, a driven clutch-member on the driven-shaft at the side of said bearing adjacent the motor, a belt-pulley on the shaft at the opposite side of said bearing, a driving clutch-member connected with the motor-shaft and disposed adjacent the driven clutch-member, and a manually operated clutch- and brake-lever and connections for establishing driving relation between said clutch-members.

3. A driving mechanism adapted to be mounted as a unit on a power-table and comprising, in combination, a motor having a frame and power-shaft, a fly-wheel fixedly mounted on one end of the motor-shaft and constituting a clutch-member having a clutch-face, a transmitter-frame rigidly associated with the motor-frame and formed with a bearing in line with but beyond said end of the motor-shaft, a driven-shaft mounted in said bearing and having its opposite ends extended beyond the latter, a driven clutch-member mounted on said shaft at the inner side of said bearing for cooperation with the driving clutch-member, a pulley mounted on said shaft at the outer side of said bearing and adapted to be connected to the machine to be driven, and manually controlled means for establishing and interrupting driving relation between the clutch-members.

4. A driving mechanism adapted to be mounted as a unit on a machine table and comprising, in combination, a motor having a frame and power-shaft, a driving clutch-member comprising a fly-wheel fixedly mounted on one end of the motor-shaft and having a clutch-face, a transmitter-frame rigidly associated with the motor-frame and formed with a bearing in line with but beyond said end of the motor-shaft, a driven-shaft journaled in said bearing, pulley and driven-clutch members carried by said driven-shaft, and a manually controlled clutch-operating lever in the form of a bell-crank mounted on said transmitter-frame and having a fulcrum disposed transversely of the driven-shaft, said lever being adapted to shift the driven clutch-member toward the driving clutch-member.

5. A driving mechanism comprising driving and driven clutch-members, a shaft carrying the driven clutch-member, separate clutch- and brake-levers pivoted transversely of said shaft, and adjustable means spaced from the pivot-point for interconnecting said levers.

6. A driving mechanism comprising driving and driven clutch-members, a shaft carrying the driven clutch-member, separate clutch- and brake-levers pivoted coaxially, one of said levers being bifurcated to embrace the other at the pivot-point, and adjustable means spaced from the pivot-point for interconnecting said levers.

7. A driving mechanism comprising driving and driven clutch-members, a frame carrying said members and formed with spaced bosses, a fulcrum-pin bridging the space between said bosses, separate clutch- and brake-levers carried by said fulcrum-pin, one of said levers being bifurcated to embrace the other at the fulcrum point, and adjustable means for interconnecting said levers.

8. In a driving mechanism, in combination, alined driving and driven shafts in non-overlapping end-to-end relation, driving and driven cone clutch-members fixed to the adjacent ends, respectively, of said shafts, and manually controlled means for sliding one of said shafts endwise to carry its clutch-element against the companion clutch element, and three circumferentially spaced sections of friction material mounted on one of said clutch-members, and separated by gaps to provide a three-point friction drive between said clutch-members.

9. A driving mechanism comprising alined driving and driven shaft sections in non-overlapping end-to-end relation, male and female cone clutch-elements mounted on the adjacent ends of the shaft-sections, and means for establishing and interrupting driving relation between the clutch-elements, the driving surface of one of said clutch-elements being circularly uninterrupted and the opposed face of the other element having circularly extended raised friction faces separated by gaps, there being a gap diametrically opposed to each friction face.

10. A driving mechanism comprising, in combination, a motor having a frame and power-shaft, a fly-wheel fixedly mounted on the motor-shaft and formed with a clutch-face, a thrust-bearing between the fly-wheel and motor-frame, a transmitter-frame rigidly assembled with the motor-frame and having a bearing in line with but beyond the end of the motor-shaft, a driven-shaft mounted in said bearing, a driven clutch-member mounted on the driven-shaft adjacent the fly-wheel, a belt-pulley mounted on the driven-shaft at the side of said bearing remote from the fly-wheel, a thrust-bearing embracing said driven-shaft adjacent said driven clutch-member, and a manually operated lever for exerting pressure upon said last mentioned thrust-bearing.

11. A driving mechanism comprising, in combination, a motor having a frame and power-shaft, a fly-wheel fixedly mounted on said shaft and formed with a clutch-face, a transmitter-frame rigidly assembled with the motor-frame and formed with a bearing in line with the motor-shaft, a driven-shaft journaled in said bearing and having both ends extended beyond the latter, a driven clutch-member mounted on the driven-shaft adjacent the motor, a belt-pulley mounted on the driven-shaft at the side of said bearing remote from the motor, a thrust-bearing including a ring embracing the driven shaft adjacent the driven clutch-member, and a manually operated lever having a yoke straddling the driven-shaft and connected to said ring.

12. An individual driving unit comprising in combination, a motor having a frame and power-shaft, a transmitter-frame rigidly assembled with the motor-frame and having a bearing in line with the motor-shaft, a driven-shaft journaled in said bearing, driven clutch and pulley elements fast on the driven-shaft, a driving clutch-element fast on the motor-shaft, and a manually operated bellcrank-lever pivoted transversely of the driven-shaft and connected to impart endwise movement to the driven-shaft to carry the driven clutch-element into engagement with the driving clutch-element.

13. An individual driving unit comprising a frame including a base adapting it to be bolted to the under side of a machine table, a motor-shaft journaled in said frame, a fly-wheel connected to the motor-shaft and formed with a clutch-face, a driven-shaft journaled in said frame, driven clutch and pulley elements mounted on the driven-shaft, and a clutch-controlling lever mounted on a pivot extending transversely of the driven-shaft, said lever having a longitudinal plane of symmetry which is substantially coincident with the vertical plane through the axis of the driven shaft.

14. A driving mechanism comprising a motor having a frame and power-shaft, a driving wheel mounted on said power-shaft, an auxiliary frame rigidly associated with the motor-frame and formed with a bearing, a shaft journaled in said bearing and carrying a driven member and belt-pulley, and means for establishing and interrupting driving relation between the driving and driven members, the transmitter-frame being formed with a guard-ring cast integral therewith and substantially surrounding the driving-wheel.

15. A driving mechanism comprising driving and driven clutch-members having mating clutch faces, a shaft carrying at one end the driven clutch-member, a pulley mounted on said shaft and spaced from the driven clutch-member, a shaft bearing support between said pulley and driven clutch-member, a clutch-controlling lever and connections for shifting said driven clutch-member toward the driving clutch-member, and a slide-pin mounted in said bearing support and connected to said clutch-controlling lever, said slide-pin being adapted to press outwardly upon said pulley and shift the latter and the driven clutch-member away from the driving member.

16. A driving mechanism comprising driving and driven clutch-members, a manually controlled clutch-operating lever and connections for establishing and interrupting driving relation between the clutch-members, a brake-lever cooperatively related to the driven clutch-member, an adjusting screw carried by one of said levers and engaged by the other lever, and a spring for holding said other lever continuously in engagement with said screw.

17. A driving mechanism comprising a motor having a frame including supporting feet, a power-shaft journaled in said frame, a transmitter frame mounted on the motor-frame, a transmitter shaft coaxial with the motor-shaft, a clutch-connection between said shafts, a manually operated device mounted on the transmitter frame for controlling said clutch-connection, and means permitting a relative rotary shift to be effected between the transmitter frame and the motor-supporting feet.

18. A driving mechanism comprising a motor having a field-frame and a power-shaft, a transmitter-frame, connecting means between said frames permitting a relative rotary shift to be effected about the center of the motor-shaft as an axis, a transmitter-shaft, and a manually controlled clutch connection between the motor and transmitter-shafts.

19. A driving mechanism comprising a frame having attaching feet adapted to be secured in a horizontal plane, a driving clutch-member mounted in said frame, a driven clutch-member coaxial with the driving clutch-member, a manually controlled clutch-operating element mounted on said frame, and means whereby the relation of the attaching feet and the clutch operating element may be altered circularly about the axis of the clutch-members to permit of mounting the mechanism on the under side of a trough-table with the attaching feet in an inclined plane without disturbing the working position of the clutch operating element.

20. A driving mechanism comprising a rotary driving clutch-member, a main frame in which said driving member is mounted to rotate, said frame having attaching feet adapted to be secured in a horizontal plane at the under side of a flat-top table, a driven clutch-member, an auxiliary frame carrying said driven member and secured to said main frame, a clutch-controlling lever mounted on the auxiliary lever and connections for establishing and interrupting driving relation between the clutch members, and means whereby the relation of the attaching feet to the clutch-controlling lever may be altered circularly about the axis of rotation of the clutch-elements to permit of mounting the driving mechanism on the under side of a trough-table with the attaching feet in an inclined plane without disturbing the working position of the clutch-controlling lever.

In testimony whereof, I have signed my name to this specification.

IRVING F. WEBB.